(12) United States Patent
Kamatani

(10) Patent No.: US 6,940,668 B2
(45) Date of Patent: Sep. 6, 2005

(54) MAGNETIC TRANSFER APPARATUS USING A SLAVE MEDIUM AND A MASTER CARRIER

(75) Inventor: Akito Kamatani, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 130 days.

(21) Appl. No.: 10/366,721

(22) Filed: Feb. 14, 2003

(65) Prior Publication Data

US 2003/0156339 A1 Aug. 21, 2003

(30) Foreign Application Priority Data

Feb. 15, 2002 (JP) ........................................ 2002-037712

(51) Int. Cl.[7] ................................................. G11B 5/86
(52) U.S. Cl. ............................................ 360/17; 360/16
(58) Field of Search .............................. 360/15, 16, 17

(56) References Cited

U.S. PATENT DOCUMENTS 6,347,016 B1 * 2/2002 Ishida et al. .................. 360/17

2001/0055167 A1 * 12/2001 Matsuda et al. .............. 360/16

FOREIGN PATENT DOCUMENTS

JP 63175229 A * 7/1988 ............ G11B/5/86

* cited by examiner

*Primary Examiner*—David Hudspeth
*Assistant Examiner*—Daniell L. Negrón
(74) *Attorney, Agent, or Firm*—Sughrue Mion, PLLC

(57) ABSTRACT

A magnetic transfer apparatus including a holder for accommodating a slave medium subjected to transfer of information and master carriers bearing an information to be transferred which are to be kept in the state of being sucked to pressure-reducing suction parts of an inner surface of the holder for mutual close contact of surfaces of the slave medium and the master carriers, a vacuum suction unit for providing a vacuum condition of the inner space, and a magnetic field application unit for applying a transfer magnetic field to the holder. At the time of performing the magnetic transfer, the pressure of the inner space of the holder by the vacuum suction unit is set higher than the suction pressure of the pressure-reducing suction parts by 1–50 kPa, whereby before mutual contact of the slave medium and the master carriers, a suction state of the master carriers is kept constant.

9 Claims, 2 Drawing Sheets

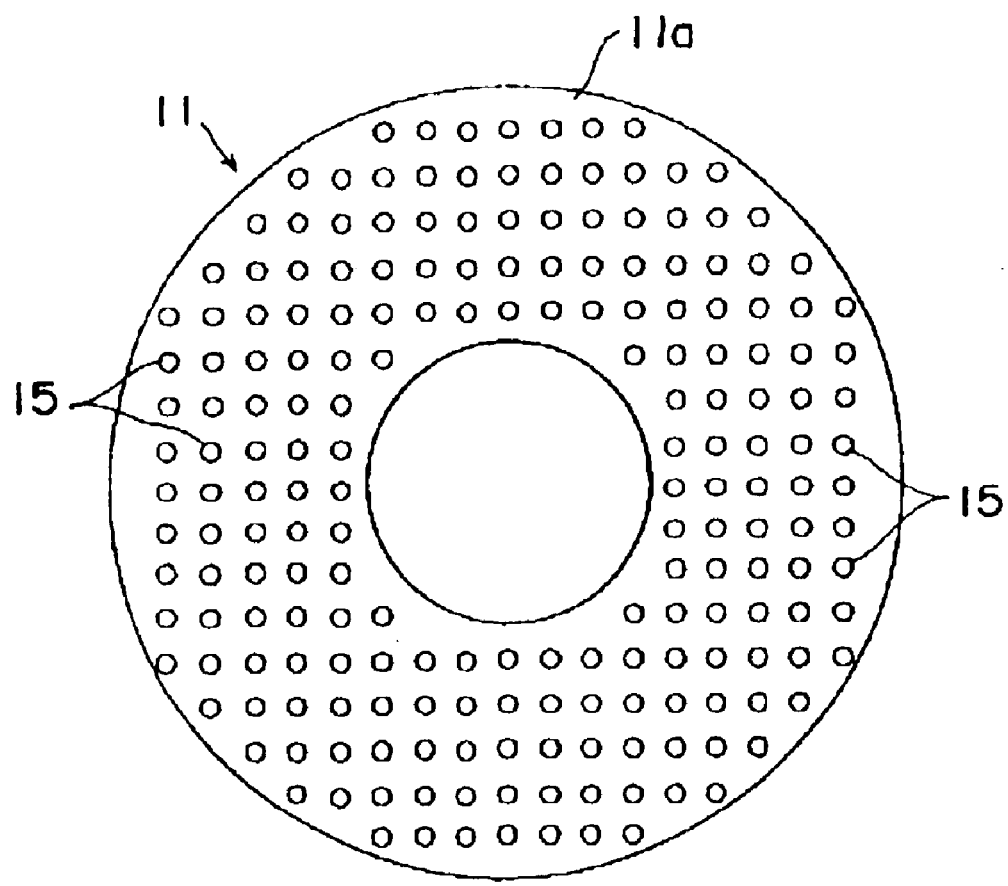

MAGNETIC TRANSFER APPARATUS USING A SLAVE MEDIUM AND A MASTER CARRIER

BACKGROUND OF THE INVENTION

1. Field of the Invention

The present invention relates to a magnetic transfer apparatus for use in performing magnetic transfer from a master carrier bearing an information to a slave medium.

2. Description of the Prior Art

Generally, a master carrier (patterned master) for magnetic transfer comprises transfer patterns such as servo signals in the form of surface irregularities or embedded structure, with at least a soft magnetic layer on a surface layer. Such a master carrier comes into close contact with a slave medium having a magnetic recording part and, and a magnetic field for transfer is applied, whereby magnetic patterns corresponding to information carried on the master carrier are transferred to and recorded on the slave medium. Such technologies are disclosed in Japanese Patent Laid-open Publication No. Sho. 63-183623 and Nos. Hei. 10-40544 and 10-269566, and Japanese Patent Laid-open Publication No. 2001-256644 and the like.

In cases where the slave medium is a disk-shaped medium such as a hard disk or high-density flexible disk, a transfer magnetic field is applied by a magnetic field application means including an electromagnet device or permanent magnet device which is disposed at one side or both sides of the slave medium, in a state that the disk-shaped master carrier is kept in close contact with a single surface or both surfaces of the slave medium.

With the intention of increasing transfer quality, it is important that the whole surface of the slave medium comes into close contact with that of the master carrier. In case of poor contact, poor recording sectors which are not magnetically transferred are formed. In such a case, some signals are missing from magnetic information transferred to the slave medium, thus decreasing signal quality. In particular, when the recorded signals are servo signals, tracking function is deteriorated, thereby lowering reliability.

As for such magnetic transfer, a plurality of slave media are sequentially subjected to magnetic transfer by a single master carrier. Hence, it is preferred that the master carrier is set in the holder of the magnetic transfer apparatus and then the slave medium is conveyed to a contact position with the master carrier, thus bringing the slave medium into close contact with the master carrier, to which a transfer magnetic field is applied. At that time, for correctly positioning the master carrier or the slave medium to be seated evenly in a flat inner surface of the holder, the above elements may be kept in the state of being sucked to pressure-reducing suction parts. For example, in case where the master carriers come into close contact with both surfaces of the slave medium to simultaneously perform magnetic transfer to the both surfaces of the slave medium, two master carriers may be set to both inner surfaces of the holder. Alternatively, when the master carrier comes into contact with a single surface of the slave medium to sequentially perform magnetic transfer to the single surface of the slave medium, the master carrier may be positioned in any one inner surface of the holder and, as necessary, the slave medium may be set in the other inner surface of the holder. Further, when the slave medium is directly set to the master carriers, the slave medium need not be separately held.

In order to increase the extent of contact between the slave medium and the master carrier, a close contacting force may be applied to bring the slave medium into close contact with the master carrier. Additionally, with a view to removing air remaining on contact surfaces of the slave medium and the master carrier by suctioning air on the contact surfaces of them, a vacuum is created in an inner space of the holder. Further, it is considered that close contacting force may be provided by vacuum suction of the inner space.

As for aforementioned magnetic transfer, on the assumption that the movement of both inner surfaces of the holder toward and away from each other for bringing the slave medium into close contact with the master carriers in the holder is controlled separately from the vacuum suction of the inner space of the holder, before the slave medium comes into close contact with the master carriers to cause close contacting force, a vacuum condition is created in the inner space of the holder to reduce the pressure therein, thereby resulting in that air on contact surfaces of the slave medium and the master carriers is removed and the surfaces may come into mutual contact with one another. Accordingly, the extent of contact of the slave medium with the master carriers may be increased.

However, the process as stated above suffers from the following disadvantage. That is, attributable to the vacuum condition of the inner space of the holder before the slave medium comes into close contact with the master carriers to cause close contacting force, the master carriers or the slave medium kept in the state of being sucked to pressure-reducing suction parts in the holder may be decreased in suction force, and may be detached from the pressure-reducing suction parts. Namely, pressure difference between suction pressure of the pressure-reducing suction parts and pressure of the inner space becomes small due to reduction of pressure of the inner space. Further, suction force of the pressure-reducing suction parts becomes decreased, and there is no difference in pressure between the pressure-reducing suction parts and the inner space. Consequently, the master carriers or the slave medium are detached from the pressure-reducing suction parts and magnetic transfer cannot be performed, or the master carriers or the slave medium may be damaged so that it cannot be used. Even though the above elements are not detached, the master carriers or the slave medium may become misaligned, thus being incapable of recording transfer signals to desired positions.

SUMMARY OF THE INVENTION

Therefore, it is an object of the present invention to solve the problems encountered in the prior art and to provide a magnetic transfer apparatus, which is advantageous in terms of performing good magnetic transfer by ensuring maintenance of master carriers and a slave medium in the state of being sucked in a holder for contact of the slave medium and the master carriers and by increasing the extent of close contact therebetween.

To achieve the above object, there is provided a magnetic transfer apparatus, comprising a holder for accommodating a slave medium subjected to transfer of information and master carriers bearing an information to be transferred which are kept in the state of being sucked to pressure-reducing suction parts positioned at an inner surface of inner space of the holder so that surfaces of the slave medium and the master carriers are held in mutual close contact; a vacuum suction unit for providing a vacuum condition of the inner space of the holder; and a magnetic field application unit for applying a transfer magnetic field to the holder, wherein at the time of performing magnetic transfer, pressure of the inner space by the vacuum suction unit is higher than suction pressure of the pressure-reducing suction parts.

Preferably, a pressure difference between pressure of the inner space and suction pressure of the pressure-reducing suction part is in the range of 1–50 kPa. When the master carriers come into close contact with the slave medium, pressure of the inner space is controlled to 1–51.3 kPa (vacuum level: −100.3~−50 kPa).

BRIEF DESCRIPTION OF THE DRAWINGS

FIG. 3 is a plan view showing main parts of an inner surface the holder.

DETAILED DESCRIPTION OF THE PREFERRED EMBODIMENTS

Figure 1:
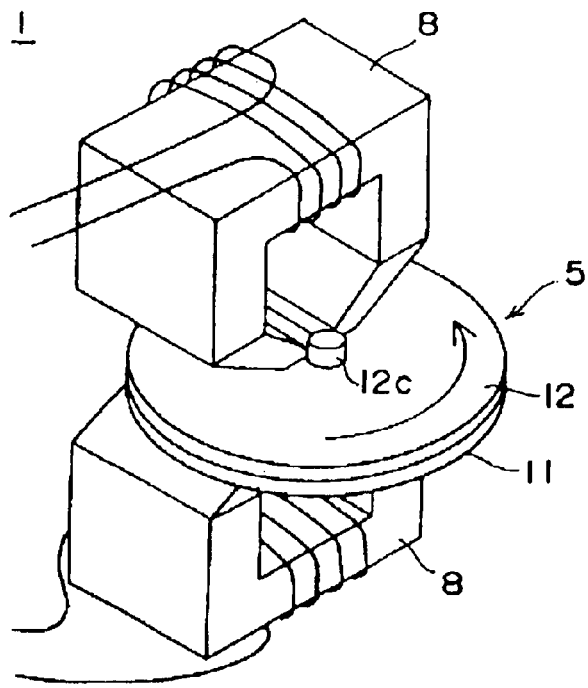
FIG. 1 is a perspective view of main parts showing transfer state of a magnetic transfer apparatus according to an embodiment of the present invention.

Hereinafter, a description will be given of a magnetic transfer apparatus of the present invention in conjunction with the accompanying drawings. A perspective view of main parts showing a transfer state of the magnetic transfer apparatus according to an embodiment of the present invention is shown in FIG. 1. As in FIGS. 2 and 3, a cross-sectional view of the holder and a plan view of an inner surface of the holder are represented, respectively. Each drawing is a schematic, and drawings are not necessarily shown to scale.

Figure 2:
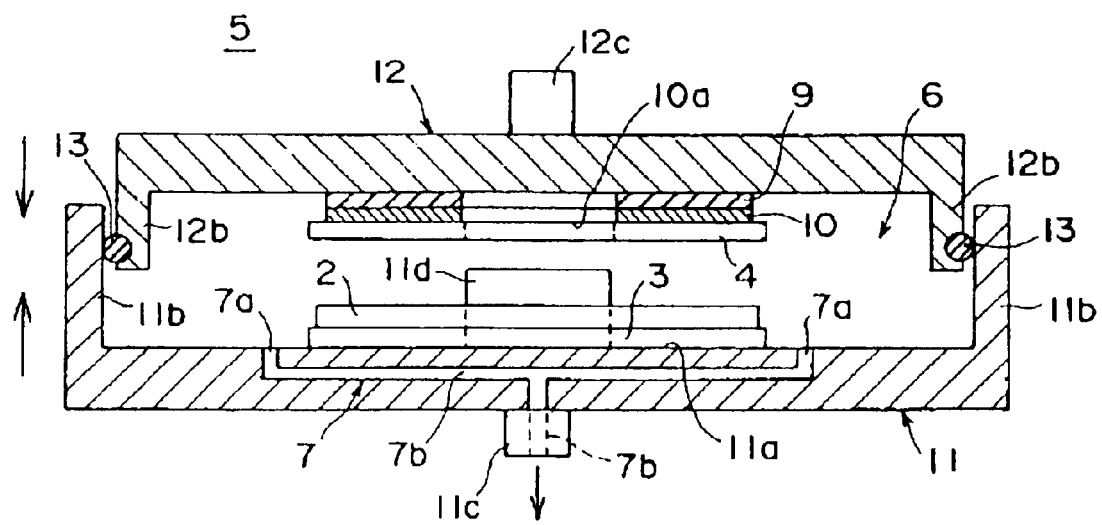
FIG. 2 is a cross-sectional view of a holder shown in FIG. 1.

Referring to FIG. 1, there is shown a magnetic transfer apparatus 1 comprising a holder 5 which includes a cylindrical base chamber casing 11 at a lower portion of the holder 5 and a compression chamber casing 12 at an upper portion thereof. As can be seen in FIG. 2, in an inner space 6 of the holder 5 formed by the above two chamber casings sealed together, lower and upper master carriers 3 and 4 are disposed at both sides of a slave medium 2, and surfaces of the slave medium 2 and the master carriers 3 and 4 are held in close contact in a state that center positions thereof are aligned. Further, the magnetic transfer apparatus 1 includes a vacuum suction unit 7 (FIG. 2) for sucking air from the inner space 6 to reduce the pressure of the inner space 6, thereby generating a close contacting force in the inner space 6, and a magnetic field application unit 8 for applying a transfer magnetic field while rotating the holder 5.

In an illustrated embodiment, the two master carriers 3 and 4 are disposed at top and bottom surfaces of the slave medium 2 positioned horizontally, and surfaces of the above component parts are held in close contact, thus simultaneously performing magnetic transfer of both surfaces of the slave medium 2. Alternatively, the slave medium 2 and the master carriers 3 and 4 may be perpendicularly disposed for magnetic transfer of the two surfaces at the same time. In addition, the master carrier 3 or 4 may be disposed at any one surface of the slave medium 2 and comes in surface contact with the slave medium 2, thereby sequentially carrying out magnetic transfer of a single surface. Herein, contact means that surfaces are held in close contact, or one surface is disposed relative to the other surface with an extremely narrow gap therebetween.

The base chamber casing 11 of the holder 5 is disk-shaped, and has a circular inner surface larger than an outer diameter of the master carrier 3, and a center portion of the inner surface is formed with a pressure-reducing suction part 11a having high flatness which functions to suck a bottom surface of the master carrier 3 in a state that a center position thereof is aligned. As shown in FIG. 3, in a portion of the pressure-reducing suction part 11a corresponding to a size of the master carrier 3, a plurality of suction holes 15 of at least about 2 mm are uniformly opened. Although not shown, the suction holes 15 communicate with a suction channel formed from inside of the base chamber casing 11 to the outside, and are connected to an external vacuum pump, to perform a suction function. Also, through the suction holes 15, a back surface of the master carrier 3 is kept in the state of being sucked to the pressure-reducing suction part 11a. Flatness of the master carrier 3 is learned by the pressure-reducing suction part 11a, and is corrected whenever being altered.

On the other hand, the compression chamber casing 12 is disk-shaped, and has an inner surface larger than an outer diameter of the master carrier 4. At the inner surface of the compression chamber casing 12, an annular sheet-like cushion member 9 (elastic member) is attached, onto which a flat rigid plate 10 having a predetermined flatness is mounted. A bottom surface of the rigid plate 10 is formed to an upper pressure-reducing suction part 10a, and sucks a top surface of the upper master carrier 4 while being centered. The pressure-reducing suction part 10a comprises opened suction holes 15 as in FIG. 3, and is connected to another vacuum pump to perform a suction function.

The compression chamber casing 12 can move axially toward and away from the base chamber casing 11 (up and down directions in drawing), and a central hole of the slave medium 2 is fitted around a center pin 11d standing at a central portion of the base chamber casing 11, whereby a position of the base chamber casing 11 is set in the holder. Rotation shafts 11c and 12c project from a bottom surface of the base chamber casing 11 and a top surface of the compression chamber casing 12, respectively. The base chamber casing 11 and the compression chamber casing 12 are connected to rotation units, which are not shown, and rotated together.

The base chamber casing 11 has a flange 11b projecting upwardly from an outer circumference thereof, while the compression chamber casing 12 has another flange 12b projecting downwardly from an outer circumference thereof. The flange 12b of the compression chamber casing 12 has an outer diameter smaller than an inner diameter of the flange 11b of the base chamber casing 11, and may be inserted into the inner circumference of the flange 11b of the base chamber casing 11 or vice versa. An O-ring sealing member 13 is fitted onto the outer circumferential face of the flange 12b of the compression chamber casing 12. When the compression chamber casing 12 is inserted into the base chamber casing 11, the sealing member 13 slidably comes into contact with the inner circumferential face of the flange 11b of the base chamber casing 11. Thereby, sealing of the axially parallel faces is achieved, and the inner space 6 between the two chamber casings 11 and 12 is sealed. The sealing member 13 may be mounted to the base chamber casing 11, and other sealing mechanism may be used.

As mentioned above, the holder 5 is formed as a cylindrical structure capable of moving the compression chamber casing 12 toward and away from the base chamber casing 11 in a state that the inner space 6 is sealed by the sealing member 13. In addition, even though the whole contact height of the slave medium 2 and the master carriers 3 and 4 is altered by changing the thickness of the slave medium 2, the master carriers 3 and 4, the cushion member 9 and the rigid plate 10, the sealed state of the inner space 6 can be ensured.

At an inner surface which is positioned inwardly from the flange 11b of the base chamber casing 11 and is positioned outwardly from the master carrier 3, exhaust ports 7a of the vacuum suction unit 7 are opened. An air channel 7b communicating with the exhaust ports 7a is formed inside the base chamber casing 11, and communicated to the outside through the rotation shaft 11c, and further connected to an external vacuum pump which is not shown. The opened exhaust ports 7a may be placed on the center pin 11d. Further, exhaust ports may be formed in the compression chamber casing 12 to perform vacuum suction of the inner space 6.

Through vacuum suction of air by the vacuum suction unit 7, the inner space 6 of the holder 5 is controlled to a predetermined pressure in the range of 1–51.3 kPa (vacuum level: −100.3~−50 kPa). Thereby, the surfaces of the slave medium 2 and the master carrier 3 are held in close contact under a predetermined contact pressure, and also air between the contact surfaces is discharged, thus increasing the extent of contact therebetween. An area of the inner surface perpendicular to a contacting direction (net area of vacuum suction region), of the inner space 6 of the holder 5 is 2–3 times larger than the contact area of the slave medium 2 and the master carriers 3 and 4, thereby increasing the vacuum force of the inner space 6. In addition, a predetermined contacting pressure in the range of 1 to 50 $N/cm^2$ (0.1–5.0 $kg/cm^2$, e.g., 20–30 $N/cm^2$ (2–3 $kg/cm^2$)) is obtained depending on vacuum levels.

With the aim of application of the close contacting force as mentioned above, an additional compression unit, which functions to mechanically press the holder 5 from the outside, may be equipped to the apparatus 1. Such a compression unit may be provided with a press cylinder, and a front end of a compression rod thereof may apply a predetermined load to the rotation shaft 12c on the compression chamber casing 12 of the holder 5.

Upon performing magnetic transfer, suction pressure of the vacuum suction unit 7 and the pressure-reducing suction parts 10a and 11a is controlled such that pressure of the inner space 6 by the vacuum suction unit 7 is higher (lower in vacuum level) than suction pressure of the pressure-reducing suction parts 10a and 11a. Preferably, pressure difference of the pressure-reducing suction parts and the inner space is set in the range of 1–50 kPa.

At the time of performing the magnetic transfer, the slave medium 2 is subjected previously to initial DC magnetization in an in-plane track direction in case of in-plane recording, or in a perpendicular direction in case of perpendicular recording. Such a slave medium 2 comes in close contact with the master carriers 3 and 4, and a transfer magnetic field is applied to a track direction or perpendicular direction opposite to the direction of initial DC magnetization to perform the magnetic transfer.

As the slave medium 2, a disk-shaped magnetic recording medium is used, for example, hard disk or high-density flexible disk with a magnetic recording part (magnetic layer) formed on both surfaces or a single surface thereof. The magnetic recording part comprises a magnetic recording layer of a coating type or a metal thin film type.

The master carriers 3 and 4 are disk-shaped, each being formed by coating a soft magnetic material on fine irregularity patterns (projections and depressions) formed on a substrate. Such coated surfaces serve as a transfer information-bearing surface formed with transfer patterns which comes into close contact with the slave medium 2. The opposite surfaces of the coated surfaces are sucked to the base chamber casing 11 and the rigid plate 10, respectively.

The substrates of the master carriers 3 and 4 are made of any material selected from among nickel, silicon, quartz plate, glass, aluminum, alloy, ceramics or synthetic resin. Pattern of the surface irregularity patterns, i.e. projections and depressions, is formed by a master stamper method. The soft magnetic material is formed by subjecting a magnetic material to vacuum film formation method such as vacuum deposition, sputtering or ion plating, and plating method. The master carriers used for in-plane recording are similar to those for perpendicular recording.

Meanwhile, the cushion member 9 functions to equally compress a back surface (top surface) of the upper master carrier 4, and is formed from an elastic material to have a disk shape and attached to the compression chamber casing 12, in which the elastic material is exemplified by general rubber, for example, silicon rubber, polyurethane rubber, fluorine rubber and butadiene rubber, or foamed resin such as sponge rubber.

The magnetic field application unit 8 applies a transfer magnetic field and, as necessary, an initial magnetic field to the holder 5. In case of in-plane recording, ring type head electromagnets are used, each of which has a coil wound around a core with a gap extending in a radial direction of the slave medium 2. The head electromagnets are disposed at both sides of the holder 5, and apply transfer magnetic fields generated parallel to a track direction, to both sides of the holder 5. With rotation of the holder 5, magnetic fields for transfer are applied to the whole surfaces of the slave medium 2 and the master carriers 3 and 4. Alternatively, the above application unit 8 may be rotatably mounted. The magnetic field application unit 8 may be disposed at any one side of the holder 5, and permanent magnet device may be disposed at any one side or both sides of the holder.

In case of perpendicular recording, electromagnets or permanent magnets having different polarities are used as the magnetic field application unit 8 and are disposed at both sides of the holder 5, and magnetic fields for transfer are generated in a perpendicular direction and applied to the holder 5. For partial application of the magnetic field, the holder 5 or the magnetic field may be moved, thus performing magnetic transfer on the whole surfaces.

Below, a description will be given of a magnetic transfer process by use of the magnetic transfer apparatus 1 of the present invention. Magnetic transfer using the inventive magnetic transfer apparatus 1 is repeatedly performed with respect to a plurality of slave mediums 2 by using the same master carriers 3 and 4. For magnetic transfer, the lower master carrier 3 is kept in place in the state of being sucked to the pressure-reducing suction part 11a of the base chamber casing 11, while the upper master carrier 4 is kept in place in the state of being sucked to the pressure-reducing suction part 10a of the rigid plate 10 of the compression chamber casing 12.

In the separated state of the compression chamber casing 12 and the base chamber casing 11, the slave medium 2 which is initially magnetized in an in-plane direction or a perpendicular direction at any one surface thereof is set to the base chamber casing 11 while being centered. Then, the compression chamber casing 12 comes into contact with the base chamber casing 11.

The sealing member 13 of the compression chamber casing 12 slidably comes into contact with an inner circumferential face of the flange 11b of the base chamber casing 11, thereby sealing the inner space 6 of the holder 5 accommodating the slave medium 2 and the master carriers 3 and 4. Before the press contacted state between the upper master carrier 4 and the slave medium 2 is accomplished, air is discharged from the inner space 6 by the vacuum suction unit 7, whereby pressure of the inner space 6 is reduced. As such, the inner space 6 is set to a pressure of a predetermined level higher than suction pressure of the pressure-reducing suction parts 10a and 11a sucking the master carriers 3 and 4. Thereby, the suction force of the pressure-reducing suction parts 10a and 11a is not reduced and the master carriers 3 and 4 are stably sucked, thus preventing the master carriers 3 and 4 from being separated and misaligned.

While the compression chamber casing 12 is downwardly moved, air between the slave medium 2 and the master carrier 3 and between the slave medium 2 and the master carrier 4 is discharged. The upper master carrier 4 comes into contact with the slave medium 2, and applies uniform close contacting force to the slave medium 2 and the master carriers 3 and 4 toward the base chamber casing 11 under pressure by external force (atmospheric pressure) depending on vacuum levels, whereby air between the contact surfaces is eliminated.

Then, the magnetic field application unit 8 approaches both sides of the holder 5 and applies magnetic fields for transfer in the opposite direction to the initial magnetization direction while rotating the holder 5. Thereby, magnetic patterns according to transfer patterns of the master carriers 3 and 4 are recorded on the magnetic recording parts of the slave medium 2.

Magnetic fields for transfer applied upon magnetic transfer are absorbed to the projection patterns through the soft magnetic material coming into contact with the slave medium 2, the projection patterns being formed into transfer patterns of the master carriers 3 and 4. In case of in-plane recording, initial magnetization at the contact portions of the slave medium 2 is not inverted, and that at the other portions is inverted. In case of perpendicular recording, initial magnetization at the contact portions is inverted, and that at the other portions is not inverted. As a result, magnetic patterns according to transfer patterns of the master carriers 3 and 4 are transferred at both surfaces of the slave medium 2 at the same time.

After magnetic transfer, operation of the vacuum suction unit 7 is stopped and pressure of the inner space 6 is raised to atmospheric pressure. In addition, the compression chamber casing 12 is separated from the base chamber casing 11, releasing the close contacting force. The slave medium 2 is removed from the holder 5 and is fed to a next process, and a new slave medium 2 is set into the holder 5, whereby magnetic transfer treatment is repeatedly performed.

According to an embodiment of the present invention, in a cylindrical holder 5, a slave medium 2 and master carriers 3 and 4 are kept in a state of being sucked to pressure-reducing suction parts 10a and 11a, and an inner space 6 between a base chamber casing 11 and a compression chamber casing 12 is sealed. Then, the inner space 6 is vacuum sucked to a predetermined level of pressure to compress the slave medium 2 by the two master carriers 3 and 4 with the close contacting force. Since a lower master carrier 3 positioned on the base chamber casing 11 has high flatness along the pressure-reducing suction part 11a, the slave medium 2 is hardly deformed due to mutual contact. Further, the upper master carrier 4 is plainly pressed by a cushion member 9 and a rigid plate 10 with uniform force regardless of the parallel degree between the inner surfaces thereof. Due to reduction of the pressure of the inner space 6 before the slave medium 2 comes into contact with the master carriers 3 and 4, air between contact surfaces of the slave medium 2 and the master carriers 3 and 4 is completely discharged, whereby the extent of close contact is improved. Further, the master carriers 3 and 4 are correctly positioned, so that the master carriers 3 and 4 kept in the state of being sucked to the pressure-reducing suction parts 10a and 11a are not detached therefrom by pressure difference between the pressure-reducing suction parts 10a, 11a and the inner space 6, thus performing magnetic transfer with high accuracy.

Although the upper master carrier 4 is disposed at the compression chamber casing 12 in the above embodiment, it may be set to be aligned with and disposed on the slave medium 2 which is placed on the lower master carrier 3 sucked to the pressure-reducing suction part 11a of the base chamber casing 11. The rigid plate 10 may not be mounted to the compression chamber casing 12, and the cushion member 9 may directly compress the upper master carrier 4. In case where flatness of the inner surfaces of the two chamber casings 11 and 12 is high, the cushion member 9 may be omitted. In such a case, suction holes 15 may be formed at an inner surface of the compression chamber casing 12 as in the pressure-reducing suction part 11a of the base chamber casing 11, and may preferably act to suck the upper master carrier 4.

In addition to simultaneous magnetic transfer of both surfaces of the slave medium 2, the master carrier 3 comes into contact with any one surface of the slave medium 2, and magnetic transfer of a single surface may be sequentially performed. In such a case, the master carrier 3 is kept in the state of being sucked to the pressure-reducing suction part 11a of the base chamber casing 11, and the slave medium 2 may be fed to the master carrier 3 or be sucked to the pressure-reducing suction part 10a of the compression chamber casing 12.

As described above, upon performing magnetic transfer, pressure of the inner space of the holder by the vacuum suction unit is higher than suction pressure of the pressure-reducing suction parts required for holding the slave medium or the master carriers in the holder. Thereby, before the master carriers come into close contact with the slave medium to cause close contacting force, vacuum suction of the inner space leads to removal of air on contact surfaces of the slave medium and the master carriers, improving mutual contact of the slave medium and the master carriers. Further, a quantity of air remaining on contact surfaces is decreased, thus increasing the extent of close contact therebetween. At that time, the master carriers or the slave medium in the state of being sucked to the pressure-reducing suction parts may be kept as they are, thus preventing the master carriers or the slave medium from being separated and misaligned, resulting in good magnetic transfer.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A magnetic transfer apparatus, comprising:
a holder for accommodating a slave medium subjected to transfer of information and master carriers bearing an information to be transferred, which are to be kept in the state of being sucked to pressure-reducing suction parts positioned at an inner surface of an inner space of the holder so that surfaces of the slave medium and the master carriers are held in mutual close contact;

a vacuum suction unit for providing a vacuum condition of the inner space of the holder; and a magnetic field application unit for applying a transfer magnetic field to the holder, wherein upon performing magnetic transfer, pressure of the inner space of the holder by the vacuum suction unit is higher than suction pressure of the pressure-reducing suction parts.

2. The magnetic transfer apparatus according to claim 1, wherein a pressure difference between pressure of the inner space and suction pressure of the pressure-reducing suction part is in the range of 1–50 kPa.

3. The magnetic transfer apparatus according to claim 1, wherein when the master carrier comes into close contact with the slave medium, pressure of the inner space is controlled to 1–51.3 kPa (vacuum level: −100.3~−50 kPa).

4. The magnetic transfer apparatus according to claim 1, wherein the slave medium and the master carriers are perpendicularly disposed to perform the magnetic transfer of both surfaces of the slave medium at the same time.

5. The magnetic transfer apparatus according to claim 1, wherein before the press contacted state between the master carrier and the slave medium is accomplished, air is discharged from the inner space by the vacuum suction unit, whereby pressure of the inner space is reduced.

6. A magnetic transfer apparatus, comprising:

a holder for accommodating a slave medium subjected to transfer of information and at least one master carrier bearing an information to be transferred, wherein the at least one master carrier is held by a first suction pressure to a pressure-reducing suction part positioned at an inner surface the holder;

a vacuum suction unit for regulating a second suction pressure of the inner space of the holder; and a magnetic field application unit for applying a transfer magnetic field to the holder, wherein the second suction pressure is higher than the first suction pressure, wherein the holder positions respective surfaces of the slave medium and the at least one master carrier so that the surfaces are held in mutual close contact, and wherein pressure in the inner space is reduced before the respective surfaces of the slave medium and the at least one master carrier make contact.

7. The magnetic transfer apparatus according to claim 1, wherein an area of the inner surface perpendicular to a contacting direction of the inner space is 2–3 times larger than the contact area of the slave medium and the master carriers.

8. The magnetic transfer apparatus according to claim 1, wherein the suction pressure in the inner space produces a contact pressure of 1 to 50 N/cm$^2$ between the slave medium and the master carriers.

9. The magnetic transfer apparatus according to claim 1, wherein the pressure-reducing suction parts only suck in the master carriers.

* * * * *